United States Patent
Kramer et al.

(10) Patent No.: US 6,597,462 B2
(45) Date of Patent: Jul. 22, 2003

(54) LASER WAVELENGTH AND BANDWIDTH MONITOR

(75) Inventors: Matthias Kramer, Goettingen (DE); Marcus Serwazi, Gleichen (DE)

(73) Assignee: Lambda Physik AG, Goettingen (DE)

( * ) Notice: Subject to any disclaimer, the term of this patent is extended or adjusted under 35 U.S.C. 154(b) by 79 days.

(21) Appl. No.: 09/791,496

(22) Filed: Feb. 22, 2001

(65) Prior Publication Data

US 2002/0005955 A1 Jan. 17, 2002

Related U.S. Application Data

(60) Provisional application No. 60/186,003, filed on Mar. 1, 2000.

(51) Int. Cl.[7] .................................................. G01B 9/02
(52) U.S. Cl. ............................ 356/519; 372/29; 372/32
(58) Field of Search ............................ 356/519; 372/29, 372/32

(56) References Cited

U.S. PATENT DOCUMENTS

| | | | |
|---|---|---|---|
| 3,806,829 A | 4/1974 | Duston et al. | ............. 331/94.5 |
| 4,016,504 A | 4/1977 | Klauminzer | ............... 331/94.5 |
| 4,309,671 A | 1/1982 | Malyon | ................. 331/94.5 S |

(List continued on next page.)

FOREIGN PATENT DOCUMENTS

| | | | | |
|---|---|---|---|---|
| DE | P 40 29 687 A1 | 9/1990 | ........... | H01S/3/082 |
| DE | 42 25 781 A1 | 8/1992 | ............. | H01S/3/08 |
| DE | 41 14 407 A1 | 11/1992 | | |

(List continued on next page.)

OTHER PUBLICATIONS

Emara, S., "Wavelength Shifts in $Hg^{198}$ as a Function of Temperature," *Journal of Research of the National Bureau of Standards—A. Physics and Chemistry*, vol. 65A, No. 6, Nov.–Dec. 1961, pp. 473–474.

J. Caplan, "Temperature and Pressure Effects on Pressure-Scanned Etalons and Gratings," *Applied Optics*, vol. 14, No. 7, Jul. 1975, pp. 1585–1591.

Masakatsu Okada et al., "Electronic Tuning of Dye Lasers by an Electro–optic Birefringent Fabry—Perot Etalon," *Optics Communications*, vol. 14, No. 1, pp. 4–7, 1975.

(List continued on next page.)

*Primary Examiner*—Robert H. Kim
*Assistant Examiner*—Therese Barber
(74) *Attorney, Agent, or Firm*—Stallman & Pollock LLP

(57) ABSTRACT

A first method for determining the relative wavelength shift of a laser beam away from a known reference line, such as an absorption line of a gas in an opto-galvanic cell or a reference line of reference laser uses a monitor etalon. The FSR of the etalon used to calculate the wavelength shift is determined based on a calculated gap spacing between the etalon plates, or etalon constant. The gap spacing is determined based on a fit to measured values of wavelength deviations of the FSR as a function of the relative wavelength shift. The FSR used to calculate the wavelength shift is also based on the wavelength shift itself. A second method for measuring the absolute bandwidth and spectral purity of a tunable laser beam uses an opto-galvanic or absorption cell. The laser beam is directed to interact with a gas in the cell that undergoes an optical transition within the spectral tuning range of the laser. The beam is tuned through the optical transition line of the gas in the cell, and the opto-galvanic or absorption spectrum of the line is measured. The measured bandwidth and spectral purity are convoluted or broadened by the bandwidth of the laser beam used in the measurement. The bandwidth and spectral purity of the laser beam are determined based on the bandwidth and spectral purity, respectively, of the measured spectrum and a known correspondence between the measured convoluted bandwidth and spectral purity and the bandwidth and spectral purity, respectively, of the laser beam.

13 Claims, 14 Drawing Sheets

U.S. PATENT DOCUMENTS

| | | | |
|---|---|---|---|
| 4,319,843 A | 3/1982 | Gornall | 356/346 |
| 4,331,937 A | 5/1982 | Brown et al. | 372/74 |
| 4,348,647 A | 9/1982 | Nighan et al. | 372/74 |
| 4,404,366 A | 9/1983 | Boguslaski et al. | 536/18.1 |
| 4,435,808 A | 3/1984 | Javan | 372/11 |
| 4,468,773 A | 8/1984 | Seaton | 372/32 |
| 4,513,422 A | 4/1985 | Buholz | 372/29 |
| 4,558,952 A | 12/1985 | Kulesh et al. | 356/349 |
| 4,592,043 A | 5/1986 | Williams | 370/3 |
| 4,611,270 A | 9/1986 | Klauminzer et al. | 364/183 |
| 4,823,354 A | 4/1989 | Znotins et al. | 372/57 |
| 4,829,536 A | 5/1989 | Kajiyama et al. | 372/57 |
| 4,856,018 A | 8/1989 | Nozue et al. | 372/98 |
| 4,905,243 A * | 2/1990 | Lokai et al. | 372/32 |
| 4,911,778 A | 3/1990 | Barnoach | 156/466 |
| 4,914,662 A | 4/1990 | Nakatani et al. | 372/32 |
| 4,926,428 A | 5/1990 | Kajiyama et al. | 372/20 |
| 4,975,919 A | 12/1990 | Amada et al. | 372/33 |
| 5,025,445 A | 6/1991 | Anderson et al. | 372/20 |
| 5,081,635 A | 1/1992 | Wakabayashi et al. | 372/57 |
| 5,095,492 A | 3/1992 | Sandstrom | 372/102 |
| 5,142,543 A | 8/1992 | Wakabayashi et al. | 372/32 |
| 5,144,632 A | 9/1992 | Thonn | 372/33 |
| 5,150,370 A | 9/1992 | Furuya et al. | 372/106 |
| 5,198,872 A | 3/1993 | Wakabayashi et al. | 356/352 |
| 5,218,421 A | 6/1993 | Wakabayashi et al. | 356/352 |
| 5,225,884 A | 7/1993 | Stark et al. | 356/73 |
| 5,226,050 A | 7/1993 | Burghardt | 372/20 |
| 5,307,364 A | 4/1994 | Turner | 372/60 |
| 5,373,515 A | 12/1994 | Wakabayashi et al. | 372/20 |
| 5,404,366 A | 4/1995 | Wakabayashi et al. | 372/29 |
| 5,420,877 A | 5/1995 | Sandstrom | 372/34 |
| 5,450,207 A | 9/1995 | Fomenkov | 356/416 |
| 5,450,436 A | 9/1995 | Mizoguchi et al. | 372/59 |
| 5,479,431 A | 12/1995 | Sobottke et al. | 372/92 |
| 5,559,816 A | 9/1996 | Basting et al. | 372/27 |
| 5,596,596 A | 1/1997 | Wakabayashi et al. | 372/102 |
| 5,642,374 A | 6/1997 | Wakabayashi et al. | 372/57 |
| 5,684,822 A | 11/1997 | Partlo | 372/95 |
| 5,748,316 A * | 5/1998 | Wakabayashi et al. | 356/519 |
| 5,761,236 A | 6/1998 | Kleinschmidt et al. | 372/100 |
| 5,764,678 A | 6/1998 | Tada | 372/57 |
| 5,771,094 A | 6/1998 | Carter et al. | 356/326 |
| 5,802,094 A | 9/1998 | Wakabayashi et al. | 372/57 |
| 5,835,520 A | 11/1998 | Das et al. | 372/57 |
| 5,852,627 A | 12/1998 | Ershov | 372/108 |
| 5,856,991 A | 1/1999 | Ershov | 372/57 |
| 5,867,514 A | 2/1999 | Anderson | 372/38 |
| 5,898,725 A | 4/1999 | Fomenkov et al. | 372/102 |
| 5,901,163 A | 5/1999 | Ershov | 372/20 |
| 5,917,849 A | 6/1999 | Ershov | 372/102 |
| 5,946,337 A | 8/1999 | Govorkov et al. | 372/92 |
| 5,949,806 A | 9/1999 | Ness et al. | 372/38 |
| 5,970,082 A | 10/1999 | Ershov | 372/102 |
| 5,978,391 A | 11/1999 | Das et al. | 372/20 |
| 5,978,394 A | 11/1999 | Newman et al. | 372/32 |
| 5,978,409 A | 11/1999 | Das et al. | 372/100 |
| 5,982,800 A | 11/1999 | Ishihara et al. | |
| 5,991,324 A | 11/1999 | Knowles et al. | 372/57 |
| 6,014,398 A | 1/2000 | Hofmann et al. | 372/60 |
| 6,028,879 A | 2/2000 | Ershov | 372/57 |
| 6,043,883 A * | 3/2000 | Leckel et al. | 356/454 |
| 6,061,129 A | 5/2000 | Ershov et al. | 356/328 |
| 6,061,382 A | 5/2000 | Govorkov et al. | 372/101 |
| 6,078,599 A | 6/2000 | Everage et al. | 372/20 |
| 6,081,542 A | 6/2000 | Scaggs | 372/70 |
| 6,094,448 A | 7/2000 | Fomenkov et al. | 372/102 |
| 6,154,470 A | 11/2000 | Basting et al. | 372/19 |
| 6,157,662 A | 12/2000 | Scaggs et al. | 372/60 |
| 6,160,825 A * | 12/2000 | Konig | 372/20 |
| 6,160,831 A | 12/2000 | Kleinschmidt et al. | 372/57 |
| 6,160,832 A | 12/2000 | Kleinschmidt et al. | 372/57 |
| 6,163,559 A | 12/2000 | Watson | 372/102 |
| 6,219,368 B1 | 4/2001 | Govorkov | 372/59 |
| 6,240,110 B1 | 5/2001 | Ershov | 372/57 |
| 6,243,163 B1 | 6/2001 | Wakabayashi et al. | 356/326 |
| 6,243,170 B1 | 6/2001 | Ershov | 356/519 |
| 6,285,701 B1 | 9/2001 | Albrecht et al. | 372/57 |
| 2001/0013933 A1 | 8/2001 | Smith et al. | 356/454 |

FOREIGN PATENT DOCUMENTS

| | | | | |
|---|---|---|---|---|
| DE | 298 22 082 U1 | 2/1999 | | H01S/3/08 |
| DE | 298 22 090 U1 | 2/1999 | | H01S/3/08 |
| DE | 299 07 349 U1 | 7/2000 | | H01S/3/086 |
| EP | 0 472 727 B1 | 11/1990 | | H01S/3/1055 |
| EP | 0 570 243 A1 | 5/1993 | | H01S/3/139 |
| EP | 0 454 399 B1 | 9/1995 | | H01S/3/137 |
| EP | 0 855 811 A2 | 7/1998 | | H04B/10/145 |
| EP | 0 875 743 A1 | 11/1998 | | G01J/9/02 |
| EP | 0 867 989 B1 | 9/1999 | | H01S/3/1055 |
| EP | 1 063 503 A1 | 12/2000 | | G01J/9/02 |
| JP | 2-631554 | 4/1997 | | H01S/3/1055 |
| WO | WO 96/07224 | 3/1996 | | H01S/3/13 |
| WO | WO 01/18923 A1 | 3/2001 | | H01S/3/22 |
| WO | WO 01/46658 A1 | 6/2001 | | G01J/3/18 |

OTHER PUBLICATIONS

R.B. Green et al., "Galvanic Detection of Optical Absorptions in a Gas Discharge," *Applied Physics Letters*, vol. 29, No. 11, pp. 727–729, Dec. 1, 1976.

H. H. Barrett, et al., "Retroreflective arrays as approximate phase conjugators," *Opt. Lett. 4.* vol. 4, No. 6, 1979, pp. 190–192.

R.A. Keller et al., "Opto–galvanic Spectroscopy in a Hollow Cathode Discharge," *J. Opt. Soc. Am.*, vol. 69, No. 5, pp. 738–742, May 1979.

Richard A. Keller et al., Atlas for Optogalvanic Wavelength Calibration, *Applied Optics*, vol. 19, No. 6, pp. 836–837, Mar. 15, 1980.

N. Tan–No, et al., "Dispersion–free amplification and oscillation in phase–conjugate four–wave mixing in an atomic vapor doublet," *IEEE J. Quantum Electronics*, 16, 1980, pp. 147–153.

W. Demtröder, *Laser Spectroscopy*, published by Springer, Berlin 1981, Chapter 4: Spectroscopic Instrumentation, pp. 99–221.

M.D. Levenson, et al., "Projection photolithography by wave–front conjugation," *J. Opt. Soc. Am*, vol. 71, No. 6, Jun. 1981, pp. 737–743.

T.R. Hicks, "Tunable Fabry–Perot Filters," *Opt. Eng.*, vol. 20, No. 6 (1981) pp. 806–514.

Norman J. Dovichi, et al., "Use of the Optogalvanic Effect and the Uranium Atlas for Wavelength Calibration of Pulsed Lasers," *Applied Optics*, vol. 21, No. 8, pp. 1468–1473, Apr. 12, 1982.

D.L. Jordan, et al., "Experimental Measurements of Non–Gaussian Scattering by a Fractal Diffuser," *Applied Physics B.*, vol. 31, 1983, pp. 179–186.

P. Camus, "Atomic Spectroscopy with Optogalvanic Detection," *Journal De Physique*, (Paris) 11C7, pp. C7–87–106, Nov. 1983.

R. Martinez–Herrero, et al., "Transmitted Amplitude by a Fabry–Perot Interferometer with Random Surface Defects," *Applied Optics*, vol. 24, No. 3, Feb. 1, 1985, pp. 315–316.

D.P. Mahapatra, et al., "Exact Evaluation of the Transmittal Amplitude for a Fabry–Perot Interferometer with Surface Defects," *Applied Optics*, vol. 25, No. 10, May 26, 1986, pp. 1646–1649.

Andersson, M., et al., "Compressible Favry–Perot Refractometer," *Applied Optics*, vol. 26, No. 22, Nov. 15, 1987, pp. 4835–4840.

F. Babin et al., "Ultraviolet Optogalvanic Laser Spectroscopy of Iron for Reference Wavelengths," *Optics Letters*, vol. 12, No. 7, pp. 468–470, Jul. 1987.

D.R. Hall, et al., *The Physics and Technology of Laser Resonator*, 1989, pp. 1–20, 94–104, 117–131, 143–153, 176–189, 220–245.

R.S. Sandstrom, "Argon Fluoride Excimer Laser Source for Sub–0.25mm Optical Lithography," *Optical/Laser Microlitography IV*, vol. 1463, pp. 610–616, 1991.

R.K. Tyson, *Principles of Adaptive Optics, $2^{nd}$ Edition*, 1991, Chapter 5: Wavefront Sensing, pp. 121–202.

Sansonetti, J.E., et al., "Atlas of the Spectrum of a Platinum/Neon Hollow–Cathode Reference Lamp in the Region 1130–4330 A", *Journal of Research of the National Institute of Standards and Technology*, vol. 97, No. 1, Jan.–Feb. 1992, 1–211.

M. Kakehata, et al., "Output Characteristics of a Discharge–pumped Fe Laser (157nm) with an Injection–seeded Unstable Resonator," *J. Appl. Phys.*, vol. 74, No. 4, Aug. 15, 1993, pp. 2241–2246.

S. M. Hooker, et al., "Progress in Vacuum Ultraviolet Lasers," *Progress in Quantum Electronics*, vol. 18, 1994, pp. 227–274.

MacBride, et al., "Effect of Temperature Variation on FT–IR Spectometer Stability," *Applied Spectroscopy*, 1997, vol. 51, No. 1, pp. 43–50.

Wakabayashi, et al., "Billion Level Durable ArF Excimer Laser with Highly Stable Ernergy," *SPIE $24^{th}$ Annual International Symposium on Microlithography*, Santa Clara, Calif., May 14–19, 1999.

A. I. Ershov, et al., "Novel Metrology for Measuring Spectral Purity of KrF Lasers for Deep UV Lithography," *Proceedings of SPIE*, vol. 3677, Jun. 1999, pp. 611–620.

* cited by examiner

LASER WAVELENGTH AND BANDWIDTH MONITOR

PRIORITY

This application claims the benefit of priority to U.S. provisional patent application No. 60/186,003, filed Mar. 1, 2000.

BACKGROUND

1. Field of the Invention

The present invention relates to wavelength and bandwidth calibration, and particularly for relative wavelength calibration, and for bandwidth calibration by convolution.

2. Discussion of the Related Art

Semiconductor manufacturers are currently using deep ultraviolet (DUV) lithography tools based on KrF-excimer laser systems operating around 248 nm, as well as the following generation of ArF-excimer laser systems operating around 193 nm. Vacuum UV (VUV) will use the $F_2$-laser operating around 157 nm.

Higher energy, higher stability, and higher efficiency excimer and molecular fluorine lasers are being developed as lithographic exposure tools for producing very small structures as chip manufacturing proceeds into the 0.18 micron regime and beyond. Specific characteristics of laser systems sought to be improved upon particularly for the lithography market include higher repetition rates, increased energy stability and dose control, increased percentage of system uptime, narrower output emission bandwidths, improved wavelength and bandwidth accuracy, and improved compatibility with stepper/scanner imaging systems.

Various components and tasks relating to today's lithography laser systems are increasingly designed to be computer- or processor-controlled. The processors are programmed to receive various inputs from components within the laser system, and to signal those components and others to perform adjustments such as gas mixture replenishment, discharge voltage control, burst control, alignment of resonator optics for energy, linewidth or wavelength adjustments, among others.

It is important for their respective applications to the field of sub-quarter micron silicon processing that each of the above laser systems become capable of emitting a narrow spectral band of known bandwidth and around a very precisely determined and finely adjustable absolute wavelength. Techniques for reducing bandwidths by special resonator designs to less than 100 pm for use with all-reflective optical imaging systems, and for catadioptric imaging systems to less than 0.6 pm, are being continuously improved upon. Depending on the laser application and imaging system for which the laser is to be used, line-selection and/or line-narrowing techniques are described at U.S. patent application Ser. Nos. 09/317,695, 09/317,527, 09/130,277, 09/244,554, 09/452,353, 09/602,184, 09/599,130 and 09/629,256, and U.S. Pat. Nos. 5,761,236, 6,081,542, 6,061,382 and 5,946,337, each of which is assigned to the same assignee as the present application, and U.S. Pat. Nos. 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, and 4,829,536, all of which are hereby incorporated by reference. Some of the line selection and/or line narrowing techniques set forth in these patents and patent applications may be used in combination.

Techniques are also available for tuning and controlling central wavelengths of emission. Absolute wavelength calibration techniques use a known absorption or emission line around the wavelength of interest as a reference (see U.S. Pat. Nos. 4,905,243, 4,926,428, 5,450,207, 5,373,515, 5,978,391, 5,978,394 and 4,823,354, and F. Babin et al., Opt. Lett., v. 12, p. 486 (1987), and R. B. Green et al., Appl. Phys. Lett., v. 29, p. 727 (1976), as well as U.S. patent application Ser. Nos. 09/416,344 and 09/271,020 (each application being assigned to the same assignee as the present application), all of the above being hereby incorporated by reference).

Babin et al. discloses using the opto-galvanic effect to determine the KrF-laser absolute emission wavelength. A galvatron having an anode and a cathode is set in the optical path of the laser beam. An Fe vapor fills the galvatron. A voltage is monitored between the cathode and anode. The emission bandwidth of the laser is narrowed and the central wavelength tuned through a range around 248 nm. When the wavelength of the beam impinging the Fe-vapor filled gas volume between the cathode and the anode corresponds to an atomic transition of Fe, a resonance between the levels causes a marked change in voltage between the anode and cathode. Since the absorption lines of Fe are well known and consistent, e.g., based on standards set forth by NIST, the absolute wavelength of the narrowed laser emission band is determinable.

U.S. Pat. No. 4,823,354 to Znotins et al. describes using a photodetector to detect the intensity of light emitted from a KrF-laser. Znotins et al. disclose to use a galvatron having benzene vapor inside, whereas U.S. Pat. No. 5,450,207 to Fomenkov discloses the same technique instead having an Fe cathode inside. The cathode of Fomenkov gives off Fe vapor which fills the galvatron when a current is generated between the cathode and an associated anode. Light emitted from the KrF-laser traverses the gaseous benzene or iron medium of the galvatron before impinging the photodetector. When the wavelength corresponds to an atomic transition of the gas medium of the galvatron, the gas absorbs the light, and the intensity of light detected is reduced. Thus, the absolute wavelength of emission of the KrF-laser is also determinable in this alternative way.

Another known technique uses sealed hollow cathode lamps containing Fe-vapor in a Ne-buffer gas environment. See Hammamatsu Datasheet: Opto-Galvanic Sensor, Galvatron L 2783 Series, November 89, Japan. Thus, the Fe-lamp has become an important and reliable measuring tool for absolute wavelength calibration for KrF-lithography laser systems in the 248 nm spectral region. The '344 application and '391 and '394 patents, mentioned above, describe techniques for absolute wavelength calibration for ArF and $F_2$ lasers.

The '243 patent, also mentioned above, describes the use of a monitor Fabry-Perot etalon to determine relative wavelength shifts away from the known Fe absorption lines, e.g., at 248.3271 nm and 248.4185 nm, among others. To do this, the laser wavelength is first calibrated to the absolute wavelength reference line, e.g., 248.3271 nm, and the laser beam is directed through the etalon. An interferometric image is projected onto a solid state image detector such as a CCD array. Next, the laser wavelength is tuned away from the 248.3271 nm line to a new wavelength. A new image is projected onto the detector, and a comparison with the original image reveals the new wavelength because the free spectral range (FSR) of the monitor etalon is presumably known (e.g., 9.25 pm). For example, if it is desired to tune the laser to 248.3641 nm, then the wavelength would be adjusted 37 pm above the 248.3271 nm Fe vapor absorption line to exactly coincide with four FSRs of the monitor etalon.

A mercury lamp for emitting reference light of known wavelength is used in U.S. Pat. No. 5,748,316. The reference light and the laser beam are each directed to the monitor etalon. A comparison of the fringe patterns produced by the reference light and the laser beam allows a determination of the wavelength of the laser beam relative to that of the reference light.

The demands of laser systems today require very specific determinations of the wavelength shift. Thus, a more precise technique is desired for calibrating the relative wavelength shift.

Other optical characteristics of a laser beam that are desired to know and control are the bandwidth and spectral purity. The bandwidth can be measured as the full width at half maximum (FWHM) of a spectral intensity distribution of a measured laser pulse. The spectral purity is determined as the spectral range within which lies 95% of the energy of the laser pulse.

The bandwidth of a radiation source used, e.g., in photolithographic applications, is constrained by its effect on imaging resolution due to chromatic aberrations in optics of catadioptric imaging systems. The bandwidth of a laser beam can be determined from measuring the widths of fringes produced as the laser beam is passed through a monitor etalon and projected onto a CCD array. A grating spectrometer may also be used and the bandwidth measured in a similar fashion (see U.S. Pat. Nos. 5,081,635 and 4,975,919, each of which is hereby incorporated by reference). It is desired, however, to have a technique for more precisely determining the bandwidth of a laser beam.

SUMMARY OF THE INVENTION

It is a first object of the invention to provide a precise technique for precisely adjusting a laser beam to a desired wavelength shifted from a known wavelength.

It is a second object of the invention to provide a precise technique for monitoring the absolute bandwidth or spectral purity of a laser beam.

In accord with the first object, a method is provided for determining the relative wavelength shift of a laser beam away from a known reference line, such as an absorption line of a gas in an opto-galvanic cell or a reference line of a reference laser. A wavemeter is used, and a monitor etalon is preferably used as the preferred wavemeter device, wherein the FSR of the etalon used to calculate the wavelength shift is determined based on a calculated gap spacing between the etalon plates. The gap spacing is determined based on a fit to measured values of wavelength deviations of the FSR as a function of the relative wavelength shift. The FSR used to calculate the wavelength shift may also be based on the wavelength shift itself. Thus, the wavelength shift of the laser beam is calculated as the number of FSRs counted as the wavelength is tuned from the known reference line, wherein the value of the FSR used in the calculation for each fringe crossed as the wavelength is tuned is calculated based on the calculated gap spacing, and preferably the wavelength shift itself.

In accord with the second object, a method is provided for measuring the absolute bandwidth of a tunable laser beam using an opto-galvanic or absorption cell. The laser beam is directed to interact with a gas in the cell that undergoes an optical transition within the spectral tuning range of the laser. The beam is tuned through the optical transition line of the gas in the cell, and the opto-galvanic or absorption spectrum of the line is measured. The measured bandwidth is convoluted or broadened by the bandwidth of the laser beam used in the measurement. The bandwidth or spectral purity of the laser beam is determined based on the width of the measured spectrum and a known correspondence between this measured convoluted width and the bandwidth of the laser beam.

INCORPORATION BY REFERENCE

What follows is a cite list of references each of which is, in addition to those references cited above in the priority section, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

R. B. Green et al., "Galvanic Detection of Optical Absorptions in a Gas Discharge," Applied Physics Letters, Vol. 29, No. 11, pp.727–729, Dec. 1, 1976;

R. Sandstrom, "Argon Fluoride Excimer Laser Source for Sub-0.25 mm Optical Lithography," Optical/Laser Microlithography IV, Vol. 1463, pp.610–616, 1991;

F. Babin et al., "Ultraviolet Optogalvanic Laser Spectroscopy of Iron for Reference Wavelengths," Optics Letters, Vol. 12, No. 7, pp. 468–470, July 1987;

P. Camus, "Atomic Spectroscopy with Optogalvanic Detection, Journal De Physique, (Paris) 11C7, pp. C7-87–106, November 1983;

Richard A. Keller et al., "Atlas for optogalvanic wavelength calibration," Applied Optics, Vol. 19, No. 6, pp. 836–837, Mar. 15, 1980;

R. A. Keller et al., "Opto-galvanic spectroscopy in a uranium hollow cathode discharge," J. Opt. Soc. Am., Vol. 69, No. 5, pp. 738–742, May 1979;

Norman J. Dovichi, et al., "Use of the optogalvanic effect and the uranium atlas for wavelength calibration of pulsed lasers," Applied Optics, Vol. 21, No. 8, pp. 1468–1473, Apr. 15, 1982;

Masakatsu Okada et al., "Electronic Tuning of Dye Lasers by an Electrooptic Birefringent Fabry-Perot Etalon," Optics Communications, Vol. 14, No. 1, pp. 4–7, 1975; and U.S. patent application Ser. Nos. 09/416,344, 09/686,483, 09/715,803, 09/741,465, 09/734,459, 60/202,564 and 60/186,096; and U.S. Pat. Nos. 4,926,428, 5,978,394, 5,450,207, 4,905,243, 5,978,391, 4,823,354, 4,319,843, 4,911,778, 4,914,662, 5,142,543, 5,198,872, 5,218,421, 5,404,366, 5,764,678, 5,771,094, and 5,025,445.

DETAILED DESCRIPTION OF THE PREFERRED EMBODIMENTS

Figure 1A:
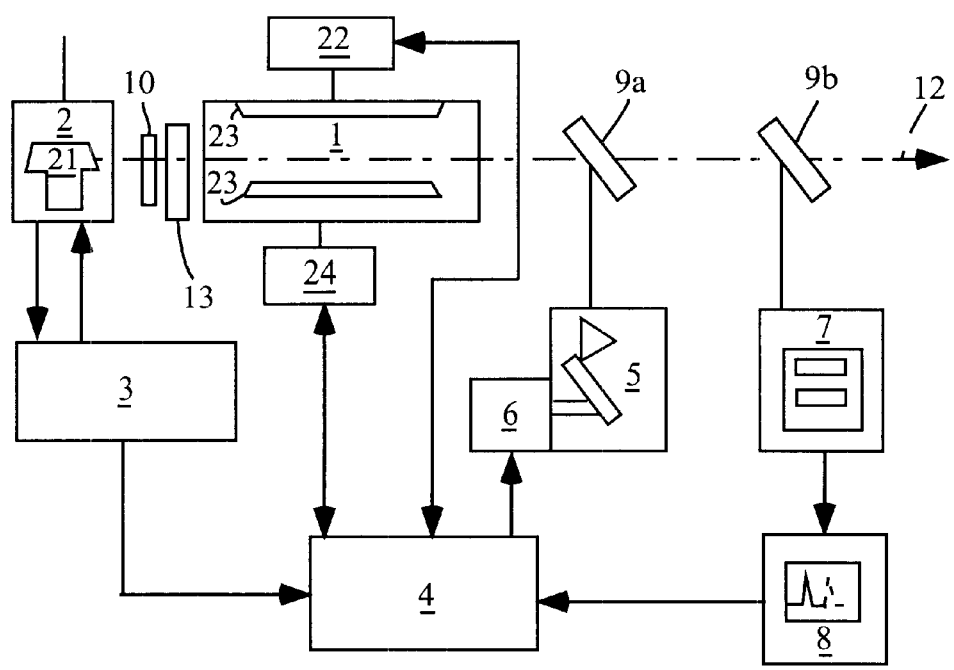
FIG. 1a schematically shows a first preferred embodiment of a laser system.

FIG. 1a schematically shows a first preferred embodiment of a laser system. A narrow band excimer or molecular fluorine laser system is the preferred laser system of FIG. 1a. The system includes a laser chamber 1 filled with a gas mixture and having a pair of main electrodes 23 and one or more preionization electrodes (not shown). The electrodes 23 are connected to a solid-state pulser and high voltage module 22. A gas handling module 24 is connected to the laser chamber 1. A laser resonator is shown surrounding the laser chamber 1 including a resonator mirror 10, a polarizer 13, a beam splitter and a line-narrowing and tuning block 5. A motor drive controls the alignment of optics such as a grating of the tuning block 5 for controlling the wavelength of the laser beam 12. A galvatron 21 is shown receiving a portion of the beam and communicating with a signal processing and driving source 3. a second beam splitter 9b is shown reflecting a portion of the beam 12 to a wavemeter which is preferably a monitor etalon 7 and an image from the etalon is projected onto a CCD array detector or display 8. A processor 4 controls various aspects of the laser system.

The monitor etalon 7 is used for performing relative wavelength calibration, whereby a wavelength of a laser beam may be tuned or shifted by a known amount. A grating spectrometer may alternatively be used. The etalon 7 produces a fringe pattern that depends on the wavelength. The fringe pattern is monitored when the wavelength is tuned or shifted, and by knowing the free spectral range of the etalon 7, the amount of wavelength shift is determined. Alternatively, the laser wavelength can be shifted a specific amount by tuning the laser and stopping the tuning when a predetermined number of free spectral ranges have been tuned through, such that it is known that the wavelength is the desired wavelength. A problem arises with conventional systems wherein the free spectral range is not precisely known for all wavelengths, and the preferred embodiments described herein below advantageously solve that problem.

The gas mixture in the laser chamber 2 typically includes about 0.1% F2, 1.0% Kr and 98.8% Ne for a KrF-laser, 0.1% F2, 1.0% Kr and 98.8% Ne and/or He for an ArF laser, and 0.1% F2 and 99.9% Ne and/or He for a F2 laser (for more details on the preferred gas mixtures, see U.S. patent application Ser. Nos. 09/447,882, 09/418,052, 09/688,561, 09/416,344, 09/379,034, 09/484,818 and 09/513,025, and U.S. Pat Nos. 4,393,505, 6,157,162 and 4,977,573, each of which is assigned to the same assignee as the present application and is hereby incorporated by reference). The laser system may be another gas discharge laser such as a KrCl, XeCl or XeF excimer laser. A trace amount of a gas additive such as xenon, argon or krypton may be included (see the '025 application, mentioned above).

The gas mixture is preferably monitored and controlled using an expert system (see the '034 application, mentioned above). One or more beam parameters indicative of the fluorine concentration in the gas mixture, which is subject to depletion, may be monitored, and the gas supply replenished accordingly (see the applications mentioned above). The processor 4 preferably receives information from various modules of the laser system including information concerning the halogen concentration in the gas mixture and initiates gas replenishment action such as micro-halogen injections, mini and partial gas replacements, and pressure adjustments by communicating with the gas handling module 24.

Although not shown, the gas handling module 24 has a series of valves connected to gas containers external to the laser system. The gas handling module 24 may also include an internal gas supply such as a halogen and/or xenon supply or generator (see the '025 application). A gas compartment (not shown) may be included in the gas handling module 24 for precise control of the micro halogen injections (see the '882 application, mentioned above, and U.S. Pat. No. 5,396,514, which is assigned to the same assignee as the present application and is hereby incorporated by reference.

Preferred main electrodes 23 are described at U.S. patent application Ser. No. 09/453,670, which is assigned to the same assignee as the present application and is hereby incorporated by reference. Other electrode configurations are set forth at U.S. Pat. Nos. 5,729,565 and 4,860,300, each of which is assigned to the same assignee and is hereby incorporated by reference. Preferred preionization units are set forth at U.S. patent application Ser. Nos. 09/692,265 and 09/247,887, each of which is assigned to the same assignee as the present application and is hereby incorporated by reference. The preferred solid state pulser module and the high voltage power supply 22 are set forth at U.S. Pat. Nos. 6,020,723 and 6,005,880, and U.S. patent application Ser. Nos. 09/640,595 and 09/390,146, each of which is assigned to the same assignee as the present application and is hereby incorporated by reference into the present application.

The resonator includes optics for line-narrowing and/or line-selection and also preferably for further narrowing the selected line. Many variations are possible For this purpose, those shown in U.S. Pat. Nos. 4,399,540, 4,905,243, 5,226,050, 5,559,816, 5,659,419, 5,663,973, 5,761,236, 6,081,542, 6,061,382, and 5,946,337, and U.S. patent application Ser. Nos. 09/317,695, 09/130,277, 09/244,554, 09/317,527, 09/073,070, 09/452,353, 09/602,184, 09/629,256, 09/599,130, 60/170,342, 60/172,749, 60/178,620, 60/173,993, 60/166,277, 60/166,967, 60/167,835, 60/170,919, 60/186,096, each of which is assigned to the same assignee as the present application, and U.S. Pat. Nos. 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, are each hereby incorporated by reference into the present application. Some of the line selection and/or line narrowing techniques set forth in these patents and patent applications may be used in combination. The laser chamber 1 normally has tilted windows, e.g., at Brewster's angle.

The discussion of the preferred embodiment with respect to the KrF-excimer laser applies similarly throughout to the ArF and molecular fluorine ($F_2$) lasers, and when necessary, important differences will be described. The main differences for the purposes of the present invention is that the $F_2$-laser emits around 157 nm, and the ArF laser emits around 193 nm, whereas the KrF laser emits around 248 nm. Thus, the wavelength calibration system for the F2-laser and the ArF laser will be sensitive to radiation around 157 nm and 193 nm, respectively, whereas that for the KrF-excimer laser system will be sensitive around 248 nm. Also, except where discussed with respect to wavelength calibration according to the present invention, species such as water vapor and oxygen that strongly photoabsorb around 157 nm will be substantially removed from the optical path of any 157 nm radiation, whereas such substantial removal may or may not be performed in the case of 193 nm radiation and are not typically performed for the 248 nm radiation. In addition, various species will interact differently with incident 248 nm, 193 nm and 157 nm radiation.

The absolute wavelength calibration module 2 contains or comprises an element 21 which has an energy level transition line or lines around 248 nm. An energy level transition line is a detected atomic or molecular transition between atomic, electronic or molecular energy states of an element 21. An optical transition is one caused, facilitated, or stimulated by interaction of the atom or molecule with a photon of light. Examples of interactions involving optical transitions include absorption, emission, Raman scattering, and stimulated emission.

The element 21 is preferably a gaseous vapor contained within a hollow cathode lamp 2. Vaporous species that may be used as the element 21 within the module 2 have lines around 248 nm. The preferred species is iron. Some of the species that may be used for ArF lasers include arsenic (193.696 nm), germanium (193.750 nm), carbon (193.0905 nm, and other lines), iron, platinum, cobalt, gaseous hydrocarbons, halogenized hydrocarbons and carbon-contaminated inert gases. In addition, oxygen may be used as the element 21 and has several optical transition lines within the broadband emission spectrum of the ArF-laser. For the $F_2$ laser, bromine, selenium and silicon may be used. Other species, in addition to those mentioned above, that have detectable level-transition lines within the laser emission spectrum may be used as the element 21 contained within the wavelength calibration module 2. Quasi-transparent crystals and liquids that exhibit transition lines around the laser line may also be used.

Figure 1B:
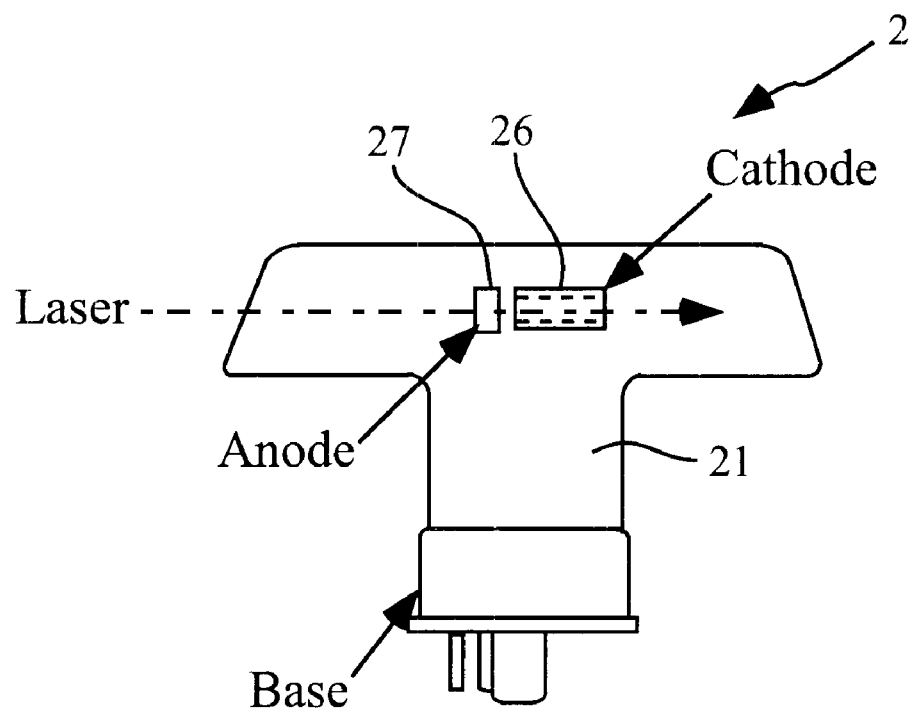
FIG. 1b schematically shows a galvatron for absolute wavelength calibration.

FIG. 1b shows a galvatron which is an example of a wavelength calibration module 2. The galvatron is preferably filled with a buffer gas and having a certain proportion of the photoabsorbing element therein. The galvatron may be purged with the element 21 in gaseous form. A laser beam portion may enter and/or exit the module through Brewster windows. A cathode 26 inside the galvatron may comprise the element 21 in solid form, and then release the element in gaseous form when a current is generated between the cathode 26 and its associated anode 27 inside the galvatron 2. Laser light from the laser chamber passes through the galvatron 2 causing an inter-level resonance of the gaseous species when the wavelength of the laser light corresponds to an inter-level transition energy of the element 21. A marked voltage change is detected between the cathode 26 and the anode 27 when the laser light is tuned to these particular wavelength(s). Therefore, when the beam has a wavelength that corresponds to an energy level transition of the gaseous species 21 within the galvatron 2, a voltage or impedance change is detected and the absolute wavelength of the narrowed band is then determinable.

Figure 1C:
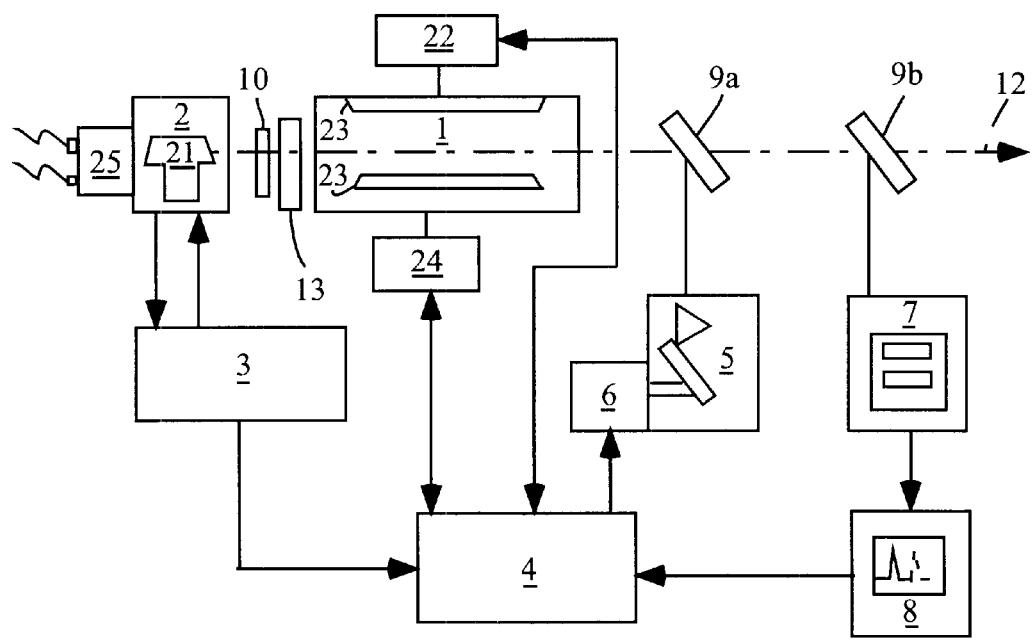
FIG. 1c schematically shows a second preferred embodiment of a laser system.

The galvatron may be used in a different way as shown in FIG. 1c. FIG. 1c includes the setup of FIG. 1a and additionally includes a photodetector 25 arranged near the galvatron. In the system of FIG. 1c, the galvatron 2 serves as a module filled with the element 21 in gaseous form, as described above. In this embodiment, the gas filled cell may be other than a galvatron, and as such, when the term galvatron is used herein it is meant broadly to mean a cell having a photoabsorbing species therein (i.e., photoabsorbing around the wavelength of interest for the laser system being used). The gaseous element 21 may be caused to fill the galvatron by forming the cathode 26 of the galvatron out of the element 21 in solid form, and running a current between the anode 27 and the cathode 26 of sufficient amplitude to sublimate the element 21.

The voltage across the anode and cathode are not monitored in the system of FIG. 1b, as they are with the system of FIG. 1a (i.e., for the purpose of detecting energy level resonances in species of the element 21 induced by the incident light). Instead, the intensity of the light as it passes through the galvatron 2 is detected. By so doing, absorption lines of the element 21 are detected when the detected intensity is reduced below that which is expected at the wavelengths corresponding to the absorption lines. Since the absolute wavelengths of photoabsorption are known for the element 21, the absolute wavelength of the laser light is determinable.

The wavelength of the laser light is determined from a knowledge of the energy band levels and transition probabilities of species of the gaseous element 21. That is, when the wavelength of the laser beam is tuned within the emission spectrum of the laser, the absolute wavelength of the beam is precisely determined each time it corresponds to an inter-level transition energy of the gaseous species 21 having a finite transition probability density. The absolute wavelengths of the transition level resonance modes are precisely and reliably known since they are determined by relative positions of adjacent or removed quantized energy states of the photo-absorbing element, and applicable transition-selection rules.

Figure 2:
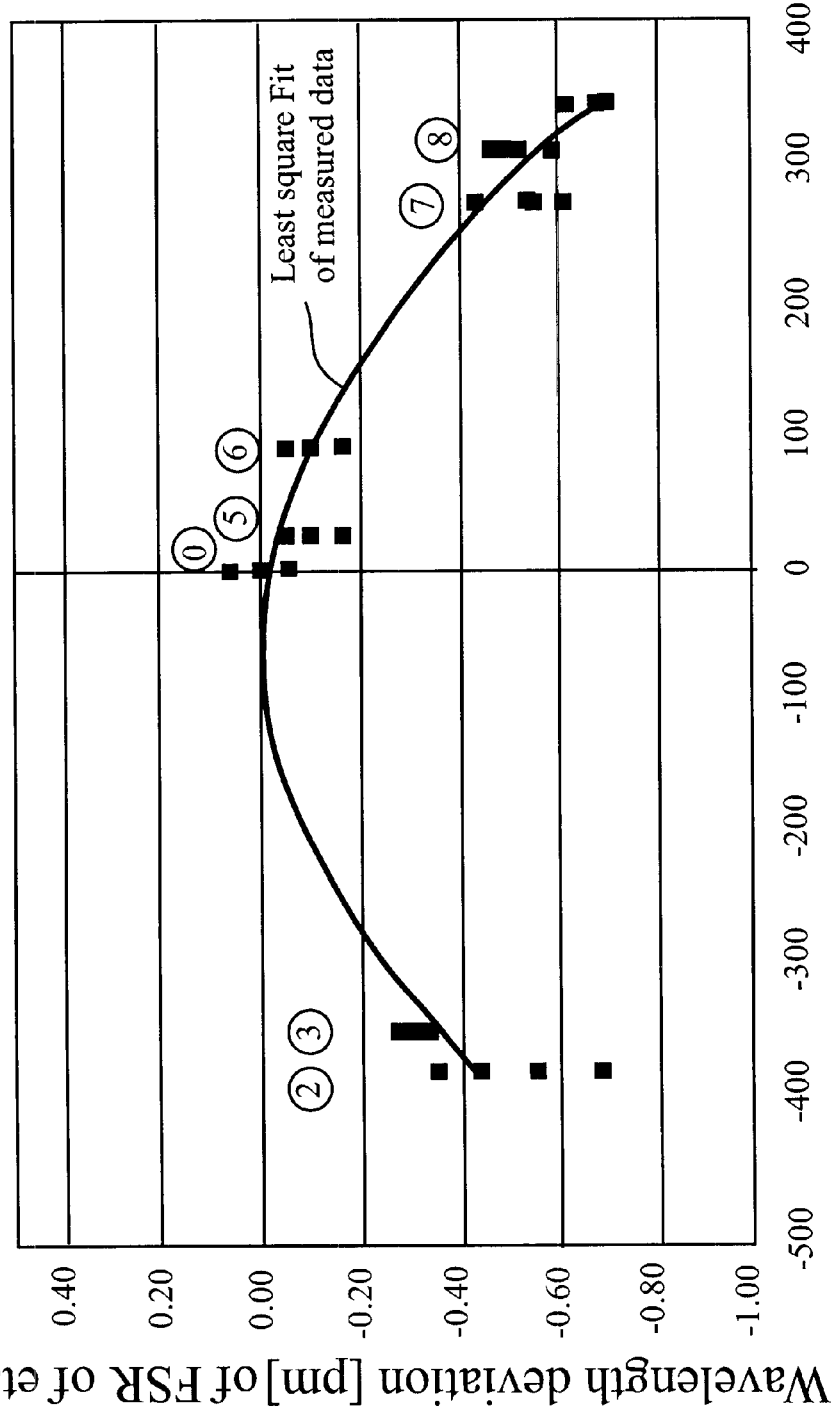
FIG. 2 shows a graph of measured wavelength deviations as a function of wavelength shifts from a reference line, and a least squares fit to the measured data.

FIG. 2 shows a graph of measured wavelength deviations as a function of wavelength shifts from a zeroeth reference line, and a least squares fit to the measured data. The zeroeth reference line is one of the transition lines discussed above for the gaseous species within the galvatron 2. Other reference lines may be used such as of a reference laser or mercury lamp line, and the absolute wavelength of laser determined based on a comparison of interferometric or spectrometric images produced by the reference and laser lines (see U.S. Pat. No. 6,160,831, which is assigned to the same assignee and is hereby incorporated by reference). The other reference lines used are for other transition lines of the gaseous species (in this case, iron) in the galvatron 2.

The peak positions of the transition lines measured using the monitor etalon 7 are observed to deviate from the known positions of the transition lines recorded at NIST. These deviations are understood to be due to a wavelength shift dependence of the FSR, which is taken as "constant" for measuring the wavelength shift using the monitor etalon. A least squares fit to the measured data is calculated is also shown overlaying the data shown at FIG. 2.

FIGS. 3–9 show the measured spectra of the interaction with absorption lines of the species in the galvatron 2 as a function of the relative wavelength shift from a zeroeth reference line (in this case at 248.3271 nm) measured using the monitor etalon 7. These measurements and the calculations and descriptions that follow can be performed for any reference line taken as the zeroeth reference line around any of the laser wavelengths (e.g., 248 nm, 193 nm and 157 nm) if there are other reference wavelengths to tune to. Bromine, e.g., has two lines around 157 nm that may be used. Oxygen and carbon also have several lines that can be used around 193 nm. The various lines are indicated in FIG. 2 (and later at FIGS. 10–11) as numbered reference lines (0), (2), (3), (5), (6), (7), and (8). The lines shown at FIGS. 3–9 represent only one data point of several that were taken for illustration purposes.

Figure 3:
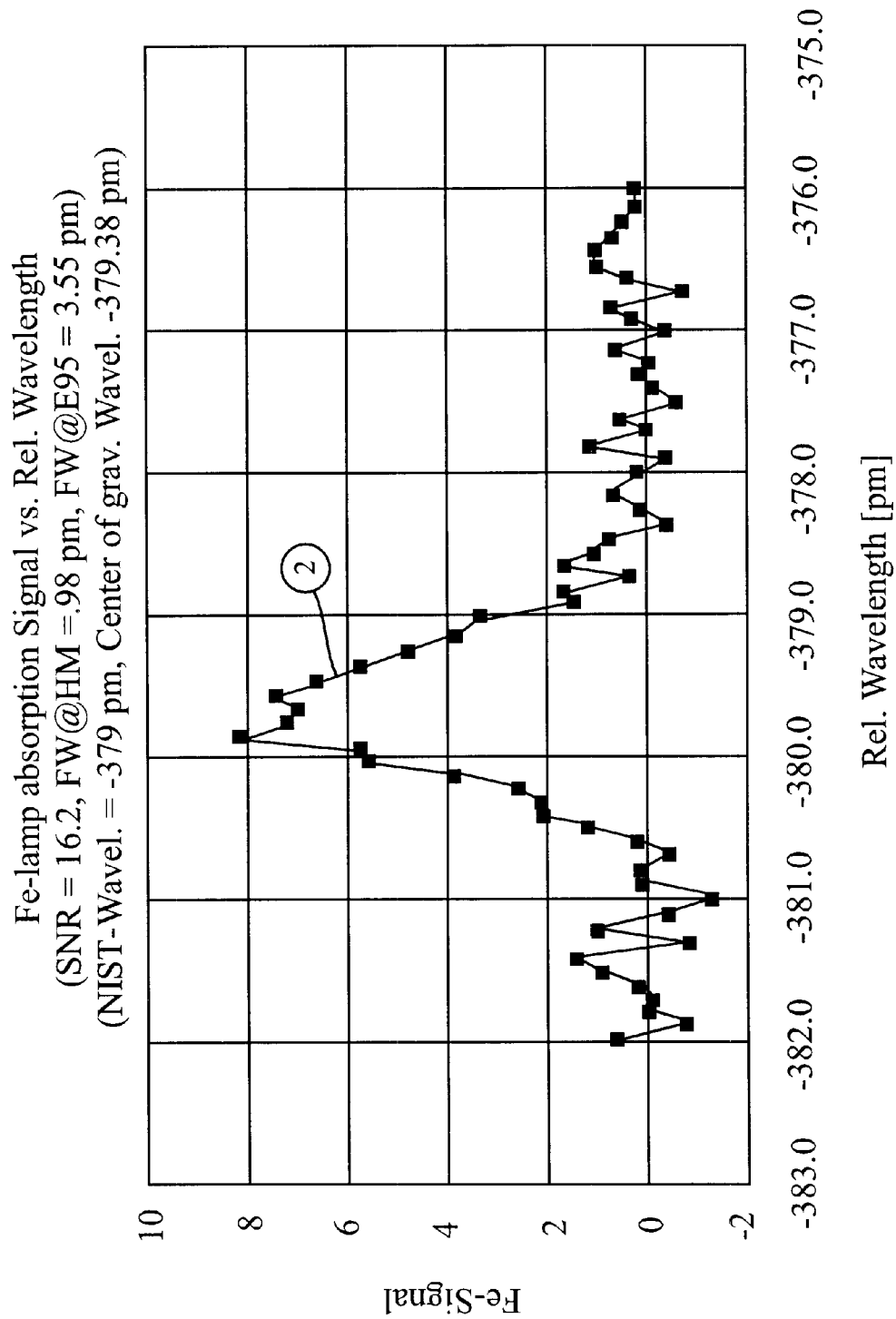
FIGS. 3–9 show seven graphs of measured wavelength photoabsorption signals at different reference lines as a function of wavelength shift from 248.327 nm.

FIG. 3 shows a graph of measured photoabsorption signal at a second reference line (2) as a function of wavelength shift from a zeroeth reference line (0). The center of gravity of the measured second reference absorption line was −379.38 pm, whereas the NIST wavelength is −379 pm, corresponding to a −0.38 pm deviation.

Figure 4:
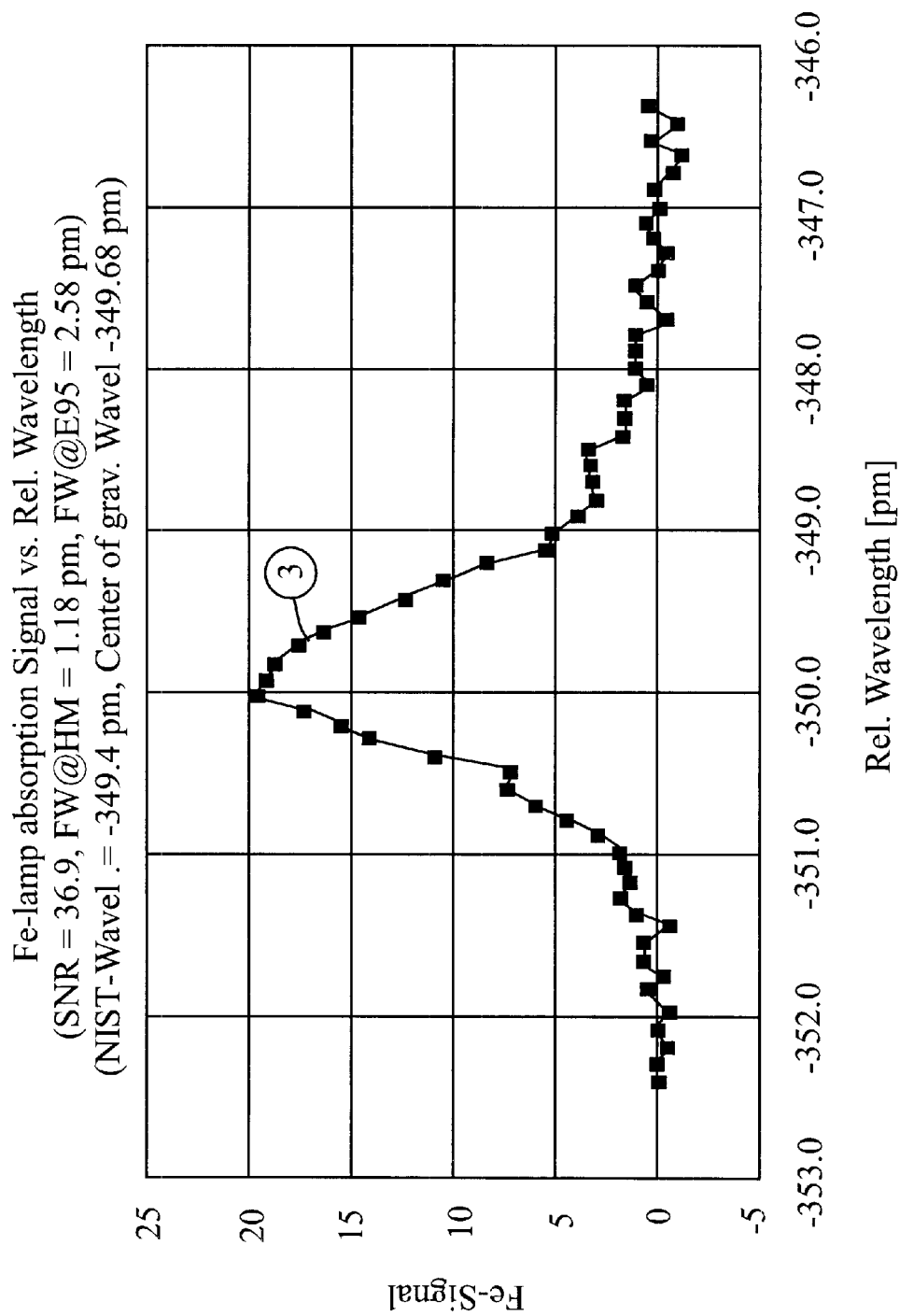

FIG. 4 shows a graph of measured photoabsorption signal at a third reference line (3) as a function of wavelength shift from the zeroeth reference line (0). The center of gravity of the measured third reference absorption line (3) was −349.68 pm, whereas the NIST wavelength is −349.4 pm, corresponding to a −0.28 pm deviation.

Figure 5:
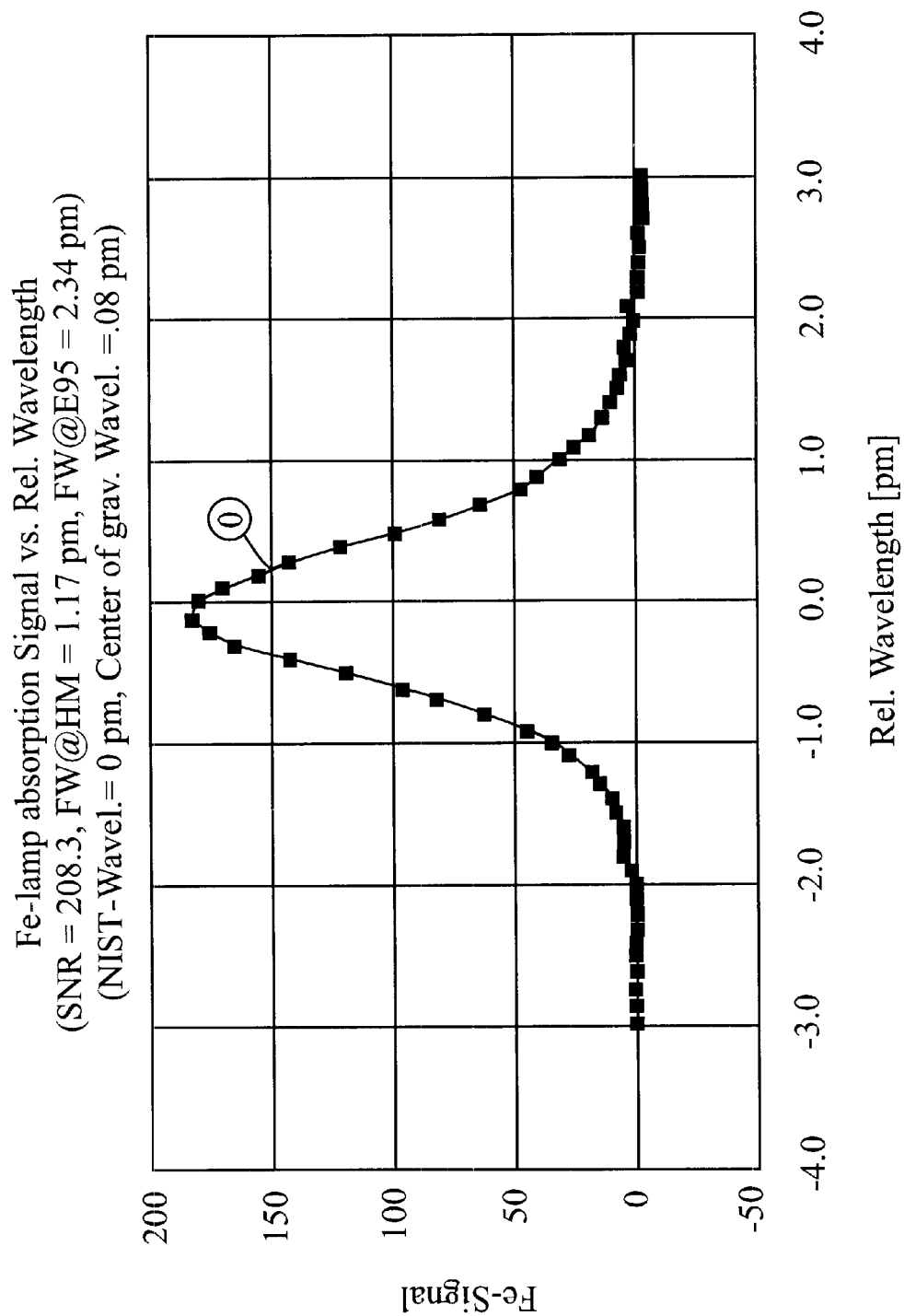

FIG. 5 shows a graph of measured photoabsorption signal at the zeroeth reference line (0) as a function of wavelength shift from the zeroeth reference line (0). The center of gravity of the measured zeroeth reference absorption line (0) was 0.08 pm, whereas the NIST wavelength is 0 pm, corresponding to a 0.08 pm deviation. This deviation is used for offset correction of the wavelength scale.

Figure 6:
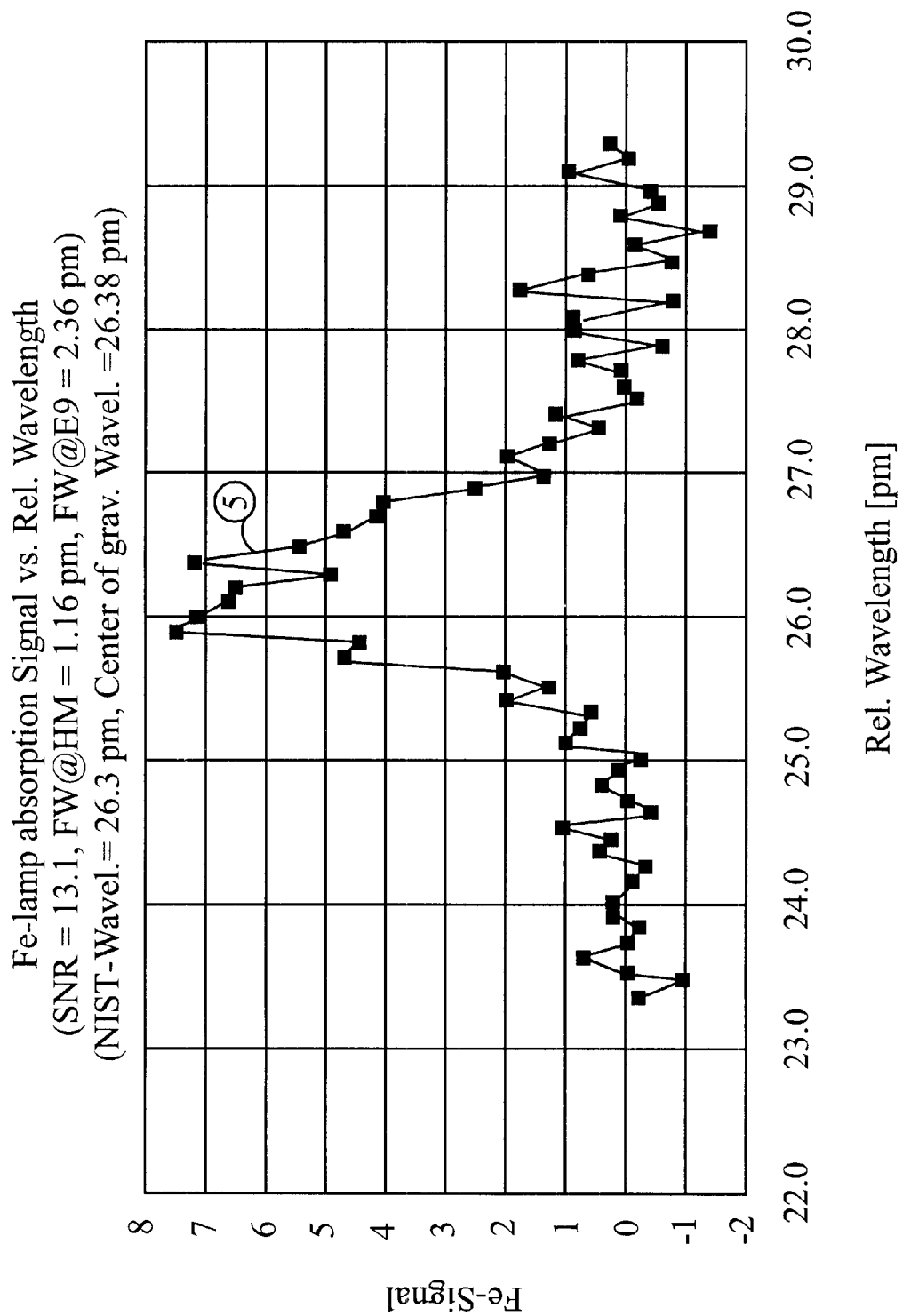

FIG. 6 shows a graph of measured photoabsorption signal at a fifth reference line (5) as a function of wavelength shift from the zeroeth reference line (0). The center of gravity of the measured fifth reference absorption line (5) was 26.39 pm, whereas the NIST wavelength is 26.3 pm, corresponding to a 0.09 pm deviation.

Figure 7:
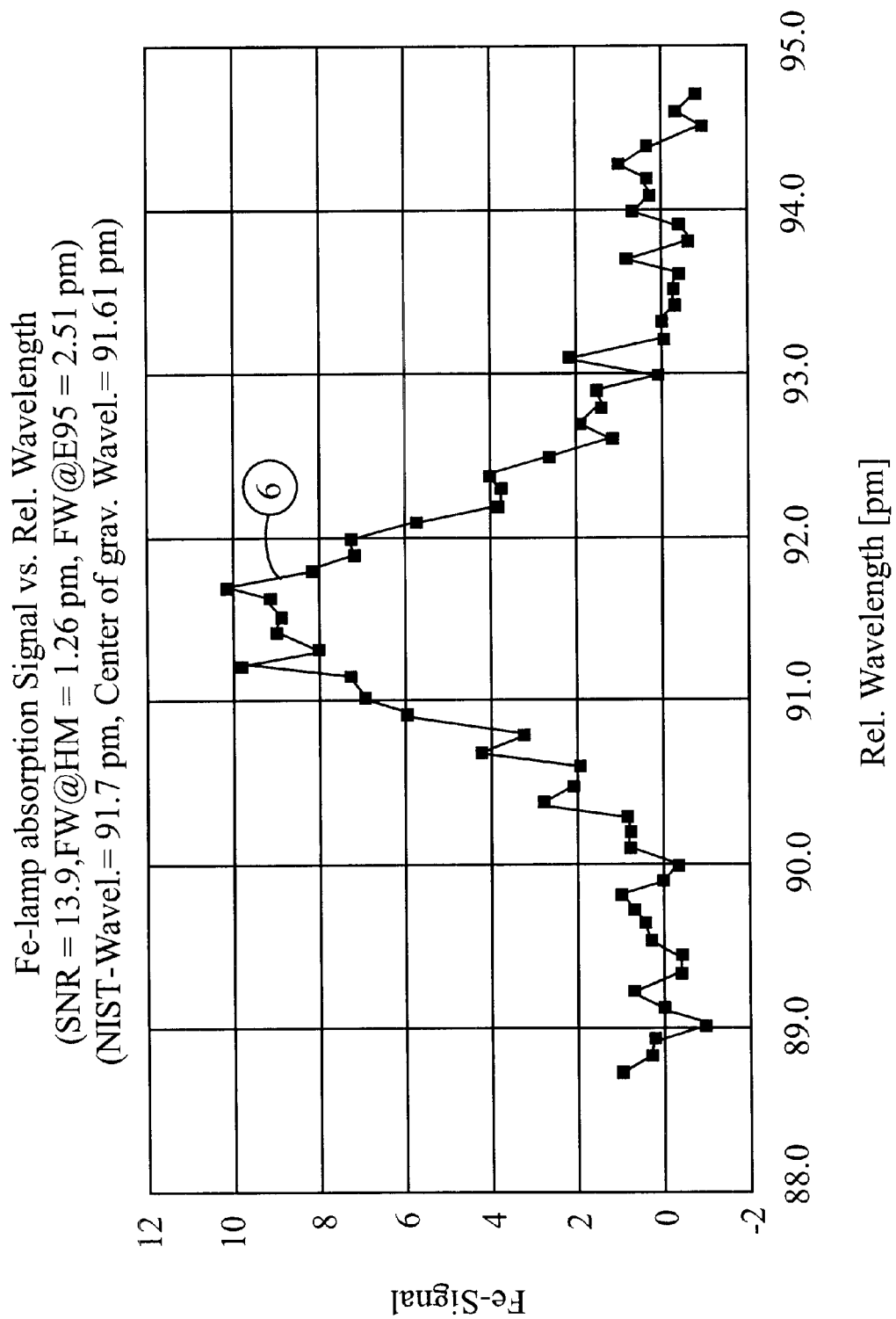

FIG. 7 shows a graph of measured photoabsorption signal at a sixth reference line (6) as a function of wavelength shift from the zeroeth reference line (0). The center of gravity of the measured sixth reference absorption line (6) was 91.61 pm, whereas the NIST wavelength is 91.7 pm, corresponding to a 0.09 pm deviation.

Figure 8:
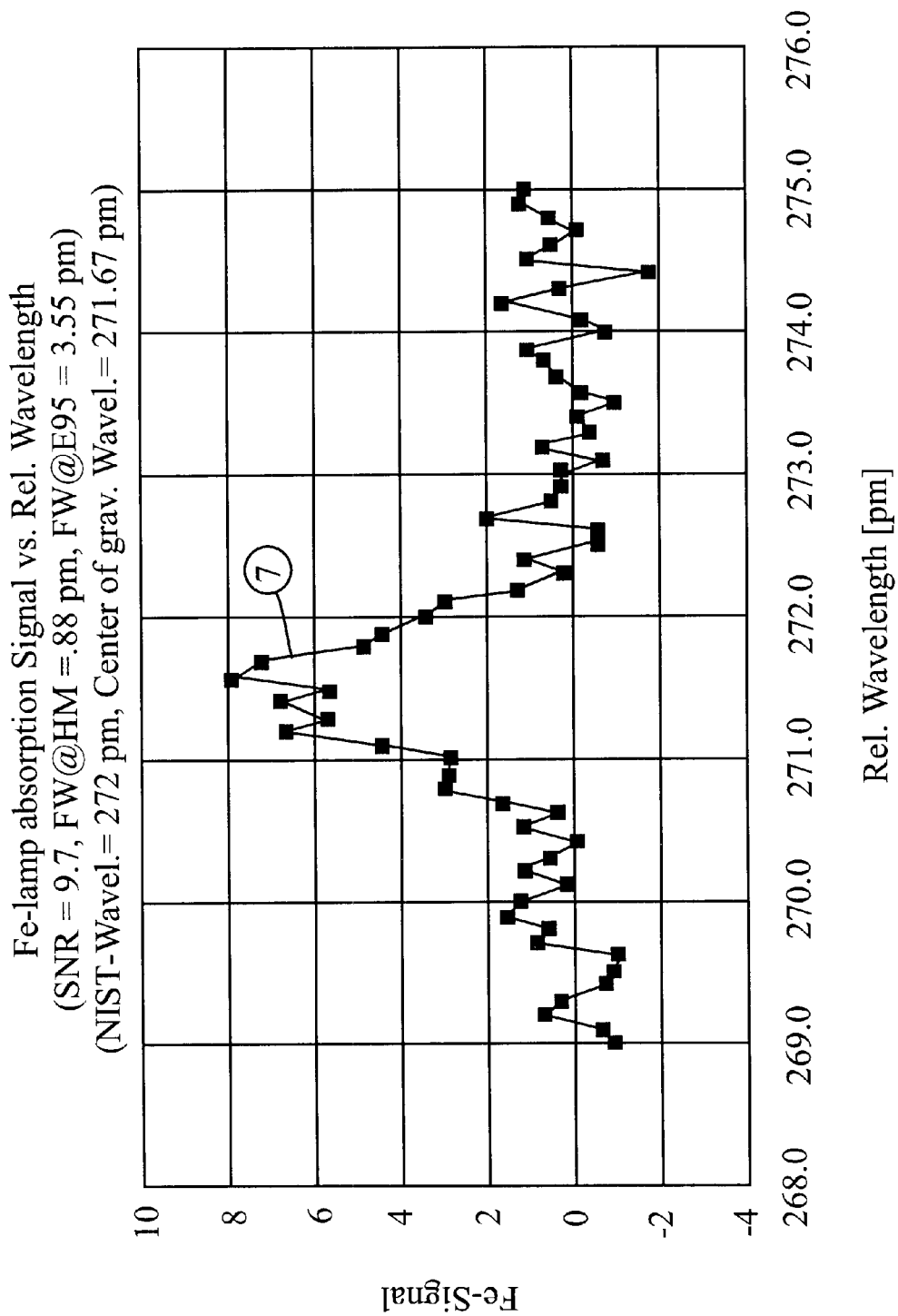

FIG. 8 shows a graph of measured photoabsorption signal at a seventh reference line (7) as a function of wavelength shift from the zeroeth reference line (0). The center of gravity of the measured seventh reference absorption line (7) was −271.67 pm, whereas the NIST wavelength is 272 pm, corresponding to a 0.33 pm deviation.

Figure 9:
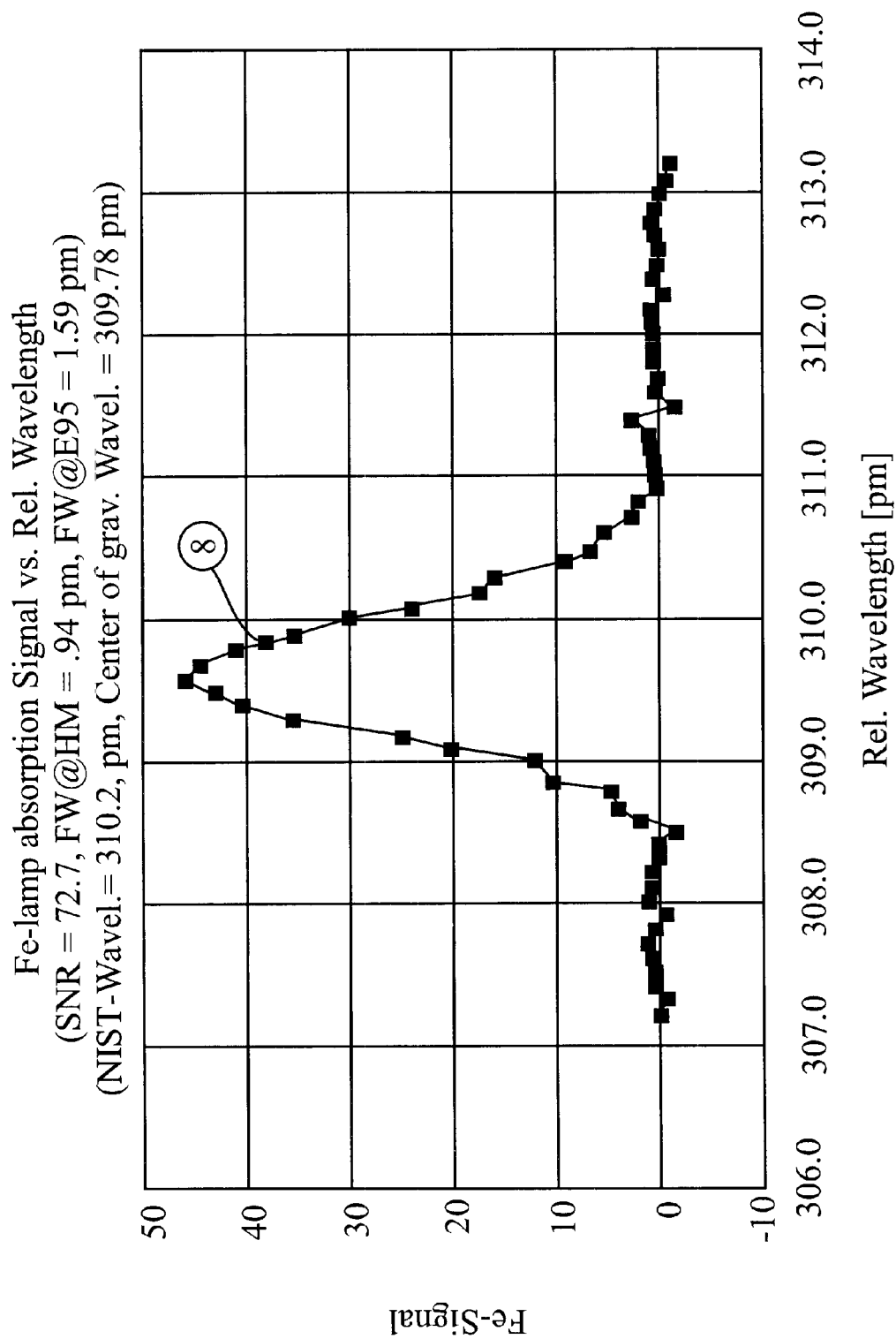

FIG. 9 shows a graph of measured photoabsorption signal at a eighth reference line (8) as a function of wavelength shift from the zeroeth reference line (0). The center of gravity of the measured eighth reference absorption line (8) was 309.76 pm, whereas the NIST wavelength is 310.2 pm, corresponding to a 0.44 pm deviaition.

As mentioned above, conventional relative wavelength calibration techniques take the wavelength dependence of the FSR of the etalon to be a constant (e.g., 9.25 pm). If this were correct, the measured positions of the reference lines would correspond exactly to the NIST wavelengths, and no deviations would have been observed, as shown and discussed with respect to FIGS. 2–9, and all of the data points would have been on the horizontal zero axis of FIG. 2. FIG. 2 shows, however, particularly the least squares fit, that the FSR deviates as the square of the wavelength $\lambda$, which is the reference wavelength $\lambda_0$ plus the wavelength shift $\Delta\lambda$. The FSR can in fact be taken as the following function of wavelength:

$$FSR(\lambda_0 + \Delta\lambda) = ((\lambda_0 + \Delta\lambda)^2 / 2nd \quad (1);$$

where $\lambda_0$ is the zeroeth reference line at 248.3271 nm, $\Delta\lambda$ is the relative shift from the zeroeth reference line $\lambda_0$, n is the index of refraction of the medium in the gap between the etalon plates, and d is the gap spacing. The gap spacing d is generally taken as 3333.000 microns for the etalon 7 used for relative wavelength monitoring.

Figure 10:
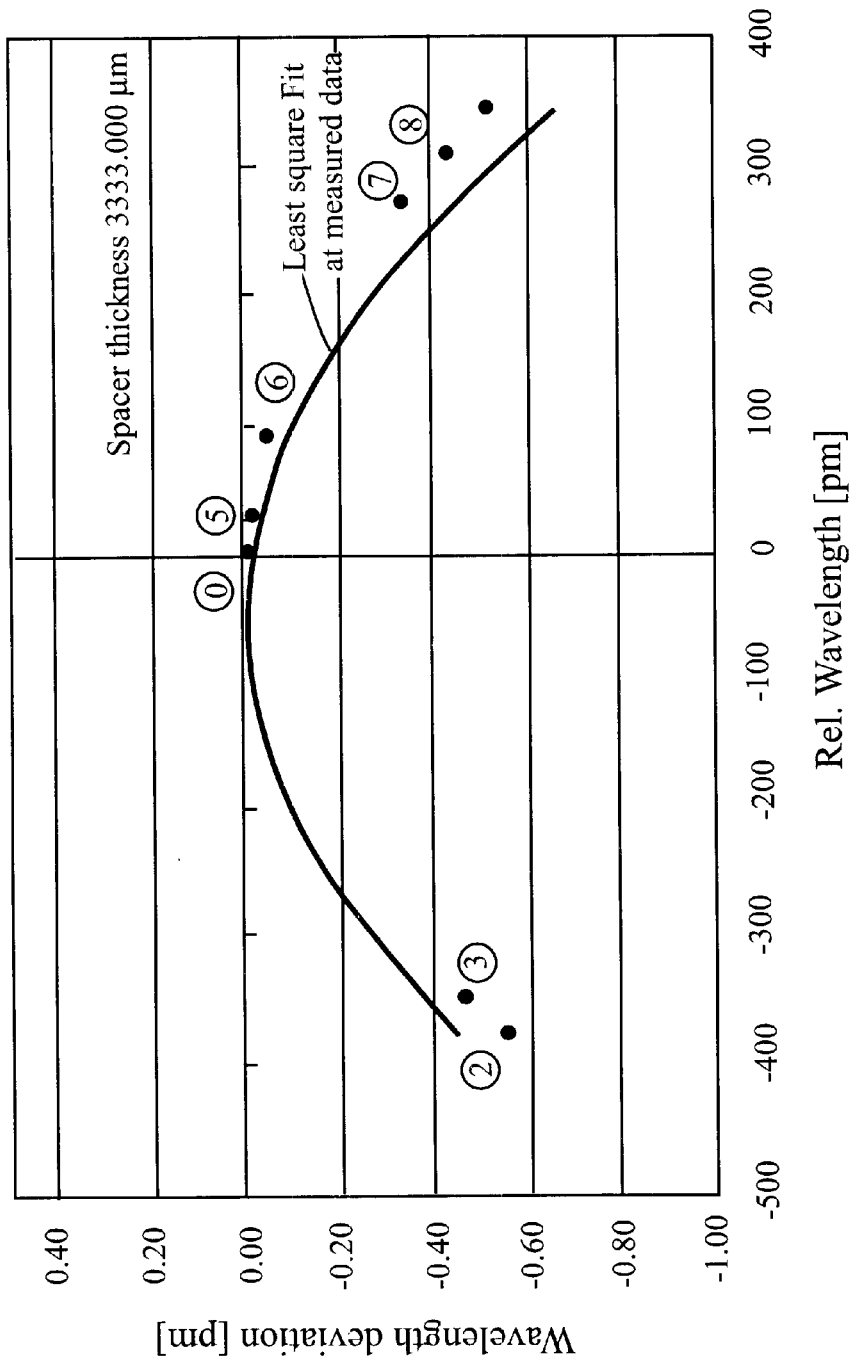
FIG. 10 shows a graph of calculated wavelength deviations as a function of wavelength shifts from a reference line using a gap spacing of 3333.00 microns, wherein the least squares fit of FIG. 2 (solid line) is overlayed with the calculated deviations (squares).

FIG. 10 shows a graph of calculated wavelength deviations as a function of wavelength shifts from a zeroeth reference line (0) using a gap spacing of 3333.00 microns, wherein the least squares fit of FIG. 2 is overlayed with the calculated deviations. A comparison of the overlayed fit with the calculated data points corresponding to the measured deviations at the same relative shifts reveals that the calculated data is not precisely matched with the measured data. Although using the calculated data plotted in FIG. 10 would be more precise than using a constant FSR (or the horizontal zero axis), a more precise technique is desired.

Figure 11:
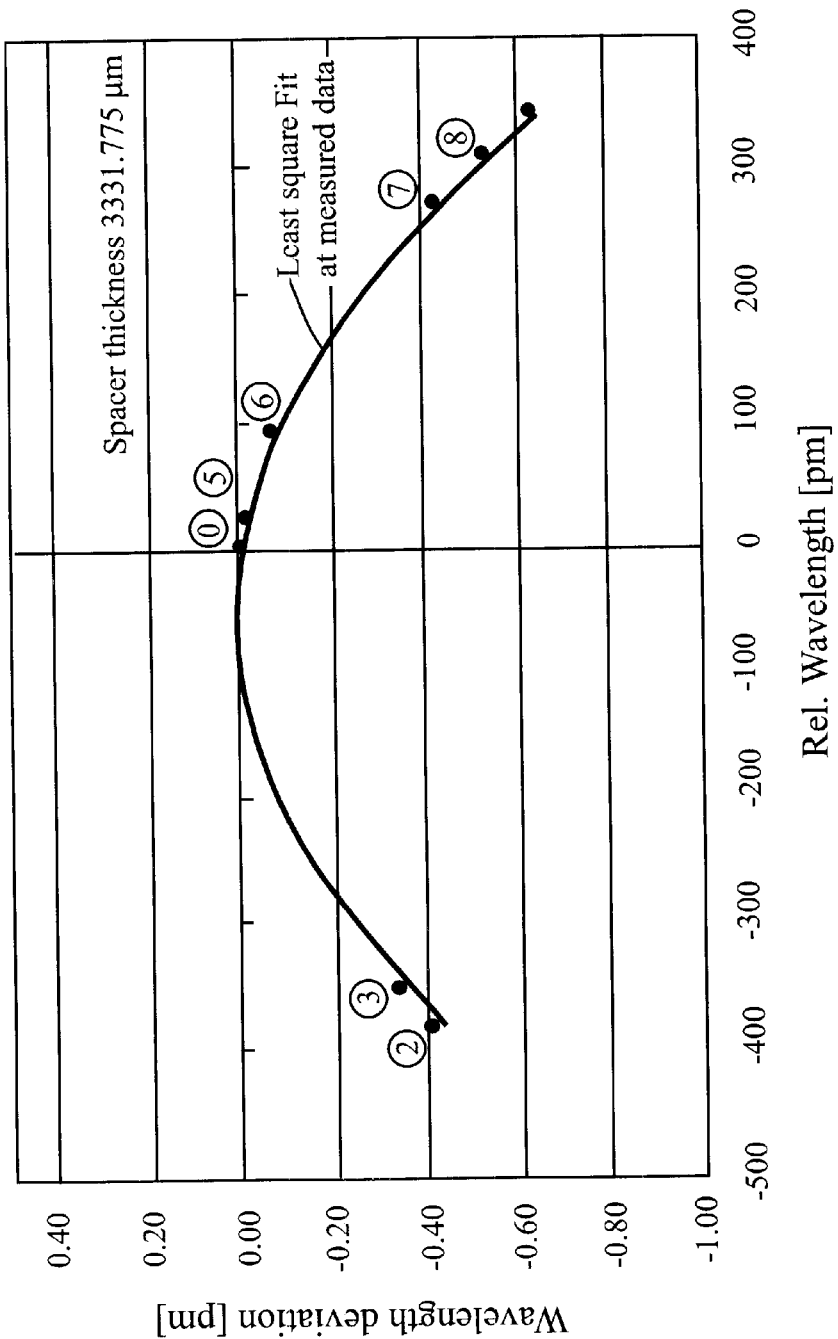
FIG. 11 shows a graph of calculated wavelength deviations as a function of wavelelength shifts from a reference line using a gap spacing of 3331.775 microns in accord with the present invention, wherein the least squares fit of FIG. 2 is overlayed with the calculated deviations.

It is thus recognized in the present invention that equation (1) should be modified to give a more precise fit to the data. The spacing d was thus varied, and can otherwise be referred to herein as an "etalon constant". FIG. 11 shows a graph of calculated wavelength deviations as a function of wavelength shifts from the zeroeth reference line (0) using a gap spacing of 3331.775 microns, wherein the least squares fit of FIG. 2 is again overlayed with the calculated deviations. The calculated data points match quite nicely with the measured fit as shown in FIG. 11.

The first object of the invention is thus met. The FSR used for determining the relative shift from a reference line based on measurements using the monitor etalon more accurately fits the measured data. Thus the relative wavelength determination is more precisely performed in accord with the preferred embodiment. In this first aspect, a modification may be used wherein absorption lines are shifted instead of the laser line, e.g., for carrying out the measurements of FIGS. 3–9.

Figure 12A:
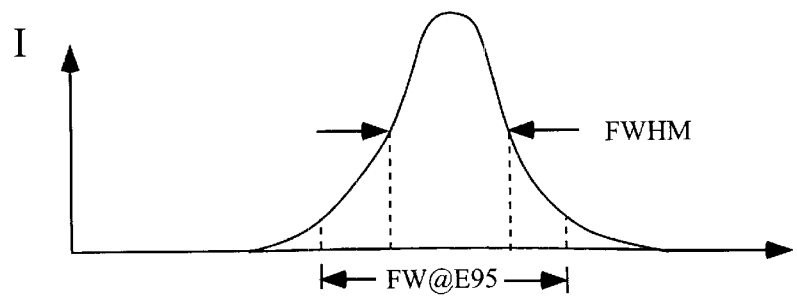
FIG. 12a shows an output pulse of a laser system.

A second embodiment in accordance with the second object of the invention is described below with reference to FIGS. 12a–12d. FIG. 12a shows a substantially gaussian lineshape such as corresponds to an output pulse of the laser system of FIG. 1a. The bandwidth of the pulse is generally taken as the full width at half maximum (FWHM) as shown in FIG. 12a. The bandwidth may be determined other than at half maximum such as, e.g., at 1/e or $1/e^2$ of the maximum. The spectral purity is generally taken to be the spectral range within which lies 95% of the energy of the pulse (FW@E95). Both the FWHM and the FW@E95 are important parameters of the laser beam, particularly of a lithography laser as mentioned above. It is therefore important to be able to measure accurately what each of these parameters is.

Figure 12B:
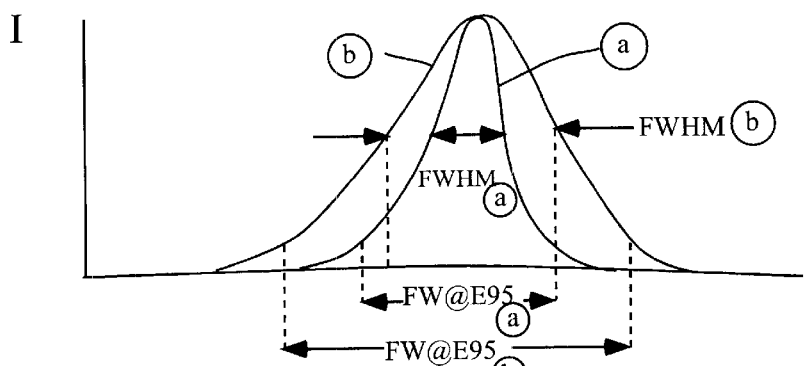
FIG. 12b shows two overlaid line shapes of the same spectral feature.

FIG. 12b shows two overlayed line shapes of the a same spectral feature. In accord with the present invention that spectral feature is an absorption line of the gaseous species 21 in the galvatron 2. The laser beam is scanned through the absorption line and the absorption spectrum of the absorption line is measured. The measured lineshape however depends on the bandwidth and spectral purity of the laser beam, and the measured spectrum is convoluted due to that finite bandwidth and spectral purity. The measured bandwidth is thus broadened by convolution.

Thus, if the laser beam has a zero bandwidth and spectral purity, and is a delta function, then the measured bandwidth and spectral purity of the absorption line would exactly match the real absorption lineshape. However, if the laser beam has a first bandwidth and first spectral purity, then the convoluted absorption spectrum (a) shown in FIG. 12b would be measured. If the laser beam had a broader second bandwidth and a broader second spectral purity, then the convoluted spectrum (b) shown in FIG. 12b would be measured. The bandwidth of spectrum (a) is shown as FWHM(a) and the spectral purity of spectrum (a) is shown as FW@E95(a). The bandwidth of spectrum (b) is shown as FWHM(b) and the spectral purity of spectrum (b) is shown as FW@E95(b).

Figure 12C:
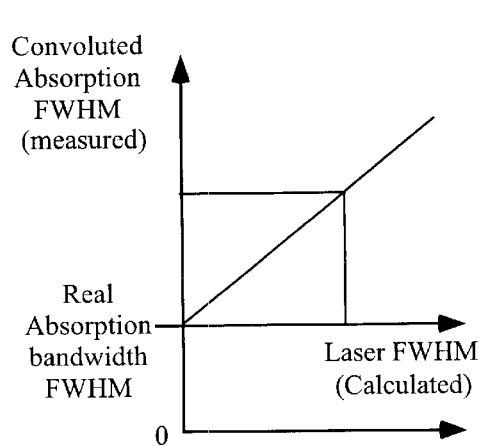
FIG. 12c shows a dependence of the measured absorption bandwidth FWHM on the laser bandwidth FWHM.

It is recognized in the present invention, that the bandwidth of a laser beam can be determined based on a knowledge of dependence of the laser bandwidth and spectral purity on the convolution of the absorption lineshape. FIG. 12c shows a dependence of the measured absorption bandwidth FWHM on the laser bandwidth FWHM. A measurement of the convoluted bandwidth FWHM of the absorption line of the gas species in the galvatron can thus be followed by a calculation of the laser bandwidth using a function that corresponds with the illustrative linear plot shown at FIG. 12c.

Figure 12D:
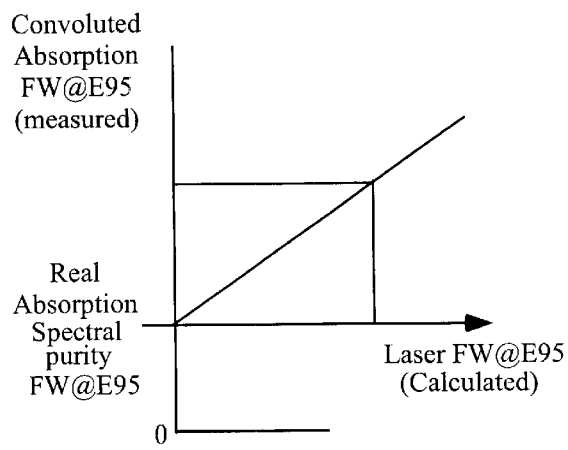
FIG. 12d shows a dependence of the measured absorption spectral purity FW@E95 on the spectural purity of the laser beam FW@E95.

FIG. 12d shows a dependence of the measured absorption spectral purity FW@E95 on the spectral purity of the laser beam FW@E95. A measurement of the convoluted spectral purity FW@E95 of the absorption line of the gas species in the galvatron can thus be followed by a calculation of the laser spectral purity FW@E95 using a function that corresponds with the illustrative linear plot shown at FIG. 12d.

The second object of the invention is thus met. Spectral characteristics such as the bandwidth and spectral purity of a laser beam can be calculated from measured values of the bandwidth and spectral purity of an absorption line using the laser beam to measure the absorption spectrum.

Those skilled in the art will appreciate that the just-disclosed preferred embodiments are subject to numerous adaptations and modifications without departing from the scope and spirit of the invention. Therefore, it is to be understood that, within the scope and spirit of the invention, the invention may be practiced other than as specifically described above. The invention is therefore not limited by any of the description of the preferred embodiments, and is instead defined by the language of the appended claims, and structural and functional equivalents thereof.

What is claimed is:

1. A method for determining a relative wavelength shift of a laser beam at an operating wavelength away from a known first reference line using a Fabry-Perot monitor etalon, comprising the steps of:

measuring data of wavelength deviations between at least one known additional reference line relative to the first reference line and a measured shift of the beam at the operating wavelength from the first reference line using the Fabry-Perot monitor etalon;

determining an etalon constant based on a fit to the data, and thus a wavelength shift dependence of the FSR of the etalon; and measuring and calculating a wavelength shift from one of the known reference lines of the beam at the operating wavelength using the etalon and the FSR calculated using the etalon constant determined in the determining step.

2. The method of claim 1, wherein the etalon constant depends on an etalon plate spacer thickness.

3. A method for measuring spectral characteristics such as absolute bandwidth and spectral purity of a tunable laser beam using a cell filled with a species that optically interacts within the tuning range of the laser beam, comprising the steps of:

optically interacting the laser beam with the species in the cell;

measuring a convoluted spectral distribution of an optical transition line of the species in the cell by scanning the laser beam wavelength through the line;

determining at least one spectral characteristic of the measured convoluted spectral distribution; and calculating the actual spectral characteristic from a known correspondence with the degree of convolution determined from the measured line.

4. The method of claim 3, wherein the spectral characteristic is selected from the group of characteristics consisting of bandwidth and spectral purity of the laser beam.

5. A method of determining an etalon constant of a Fabry-Perot etalon, comprising the steps of:

measuring data of wavelength deviations between at least a first reference line relative to a second reference line and a measured shift from the first reference line to an operating wavelength different from each of the first and second wavelengths using the Fabry-Perot monitor etalon; and determining an etalon constant based on a fit to the data, and thus a wavelength shift dependence of the FSR of the etalon.

6. The method of claim 5, further comprising the steps of measuring and calculating a wavelength shift from one of the known reference lines to the operating wavelength using the etalon and the FSR calculated using the etalon constant determined in the determining step.

7. The method of claim 6, wherein the etalon constant depends on an etalon plate spacer thickness.

8. A method for determining a wavelength deviation of an operating wavelength of a laser beam away from a target wavelength using a spectrometer, comprising the steps of:

measuring data of wavelength deviations between at least a first reference wavelength relative to the target wavelength and a measured shift of the operating wavelength from a second reference wavelength using the spectrometer; and measuring and calculating a wavelength shift of the operating wavelength from one of the target wavelength, and the first and second reference wavelengths using the spectrometer.

9. A method for determining an actual wavelength of a tunable laser beam using a spectrometer, comprising the steps of:

optically interacting the laser beam with the spectrometer;

measuring a convoluted spectral distribution of a response spectrum of the spectrometer by scanning the laser beam wavelength through the response spectrum;

determining the wavelength of the measured convoluted spectral distribution; and calculating the actual wavelength from a known correspondence with the degree of convolution determined from the measured spectrum.

10. The method of claim 9, further comprising determining a spectral characteristic of the tunable laser beam selected from the group of spectral characteristics of the tunable laser beam consisting of bandwidth and spectral purity.

11. A method for determining a deviation of a spectral characteristic of a tunable laser beam generated by a tunable laser away from a target value of the spectral characteristic using a spectrometer, comprising the steps of:

measuring data of deviations of the spectral characteristic between at least a second value relative to the target value of the spectral characteristic and a measured deviation of the operating value of the spectral characteristic from the target value of the spectral characteristic using the spectrometer;

measuring and calculating a deviation of the operating value of the spectral characteristic from one of the target and second values of the spectral characteristic using the spectrometer; and adjusting a tunable optic of a resonator of the tunable laser for adjusting the operating value of the spectral characteristic to substantially the target value.

12. The method of claim 11, wherein the spectral characteristic is selected from the group of spectral characteristics of the tunable laser beam consisting of bandwidth and spectral purity.

13. The method of claim 11, wherein the spectral characteristic is wavelength.

* * * * *